(12) United States Patent
Chen et al.

(10) Patent No.: US 7,877,083 B2
(45) Date of Patent: *Jan. 25, 2011

(54) METHOD AND SYSTEM FOR VERIFYING TELEPHONE NUMBERS ACROSS SERVICE PROVIDERS

(75) Inventors: Yen-Fu Chen, Austin, TX (US); Fabian F. Morgan, Austin, TX (US); Keith Raymond Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1126 days.

This patent is subject to a terminal disclaimer.

(21) Appl. No.: 11/553,085

(22) Filed: Oct. 26, 2006

(65) Prior Publication Data

US 2008/0101572 A1 May 1, 2008

(51) Int. Cl.
*H04M 3/42* (2006.01)
(52) U.S. Cl. ............. 455/414.1; 455/412.1; 379/218.01
(58) Field of Classification Search .................
379/142.01–142.04, 201.01–201.05, 207.14,
379/216.01, 218.01, 355.01–355.1; 455/412.1,
455/414.1, 418–420
See application file for complete search history.

(56) References Cited

U.S. PATENT DOCUMENTS

| | | | |
|---|---|---|---|
| 5,732,132 A * | 3/1998 | Hamada | 379/354 |
| 5,832,061 A * | 11/1998 | Rubin | 379/88.1 |
| 5,875,240 A | 2/1999 | Silverman | |
| 6,049,601 A | 4/2000 | Orui | |
| 6,070,241 A | 5/2000 | Edwards et al. | |
| 6,556,662 B1 | 4/2003 | Miller et al. | |
| 6,608,890 B1 * | 8/2003 | Schulz et al. | 379/201.05 |
| 6,631,187 B1 | 10/2003 | Juhola et al. | |
| 6,856,678 B2 | 2/2005 | Catley et al. | |
| 6,904,138 B1 * | 6/2005 | Loebig | 379/201.03 |
| 6,973,299 B2 * | 12/2005 | Apfel | 455/412.2 |
| 7,251,318 B1 * | 7/2007 | Henderson | 379/142.04 |
| 2006/0126810 A1 * | 6/2006 | Wilson et al. | 379/142.01 |
| 2006/0239434 A1 * | 10/2006 | Acharya | 379/218.01 |
| 2007/0253544 A1 * | 11/2007 | Bookstaff | 379/201.01 |
| 2007/0291925 A1 * | 12/2007 | Goldman et al. | 379/266.07 |

* cited by examiner

*Primary Examiner*—Ahmad F Matar
*Assistant Examiner*—Oleg Asanbayev
(74) *Attorney, Agent, or Firm*—Yee & Associates, P.C.; William H. Steinberg

(57) ABSTRACT

A system for verifying and updating a telephone number across service providers. After dialing a telephone number, a contact name and a timestamp in a central repository is compared with a contact name and a timestamp in a storage device. If the contact name in the central repository does not match the contact name in the storage device and the timestamp in the central repository is not more recent than the timestamp in the storage device, a determination is made as to whether the central repository indicates that a new telephone number is associated with the contact name. If a new telephone number is indicated for the contact name, the central repository is queried for the new telephone number. In response to the new telephone number being found, the dialed telephone number is routed to the new telephone number. Also, the storage device is updated with the new telephone number.

12 Claims, 2 Drawing Sheets

METHOD AND SYSTEM FOR VERIFYING TELEPHONE NUMBERS ACROSS SERVICE PROVIDERS

BACKGROUND OF THE INVENTION

1. Field of the Invention

The present invention relates generally to an improved communication device. More specifically, the present invention is directed to a computer implemented method and computer usable program code in a communication device for automatically verifying and updating telephone numbers across service providers.

2. Description of the Related Art

Innovations in communications technologies have made a wide range of enhanced communications services available to a user. For example, a user may dial a telephone number at the press of a key by using speed-dialing, retrieve a telephone number for a missed call, view a telephone number of an incoming call on a display by using caller identification (caller ID), and send or retrieve a voice message by using voice mail. A communications provider often provides these services through a network such as an intelligent services network (ISN) that is privately owned but that works in conjunction with the public switched telephone network (PSTN). These services also may be offered by a dedicated device, such as a telephone with advanced electronics or a telephone answering machine, located at the user's premises.

However, one problem associated with current communications technologies is that there is no way for a user of a communication device to know whether a dialed telephone number is correct for an intended party prior to making the connection with the dialed telephone number. This is especially true in a situation where the user of the communication device utilizes a different service provider than the intended party because service providers are not fully integrated to allow cross-access to database information by non-customers. Since there is no way to verify that the dialed number is correct, or even currently active, prior to making the connection, the calling party must wait for the service provider to connect the call as dialed and then attempt to ascertain whether the dialed number is actually associated with the intended party. This process of ascertaining whether the dialed number is correct or not may be tedious and time consuming. In addition, the calling party may be responsible for paying a completed call charge and/or roaming fees to make this determination without any assurance that the dialed number is correct.

Therefore, it would be beneficial to have an improved computer implemented method and computer usable program code for automatically verifying and updating a telephone number across service providers.

SUMMARY OF THE INVENTION

Illustrative embodiments provide a computer implemented method and computer usable program code for automatically verifying and updating a telephone number across service providers. In response to a telephone number being dialed, a determination is made as to whether a contact name in a central repository associated with the dialed telephone number matches a contact name in a storage device associated with the dialed telephone number and a timestamp in the central repository associated with the dialed number is more recent than a timestamp in the storage device associated with the dialed number. If the contact name in the central repository does not match the contact name in the storage device and if the timestamp in the central repository is not more recent than the timestamp in the storage device, a determination is made as to whether the central repository indicates that a new telephone number is associated with the contact name to automatically verify the dialed telephone number. If the central repository indicates that a new telephone number is associated with the contact name, the central repository is queried for the new telephone number. In response to the new telephone number being found in the central repository, the dialed telephone number is routed to the new telephone number. Also, the storage device is updated with the new telephone number associated with the contact name.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
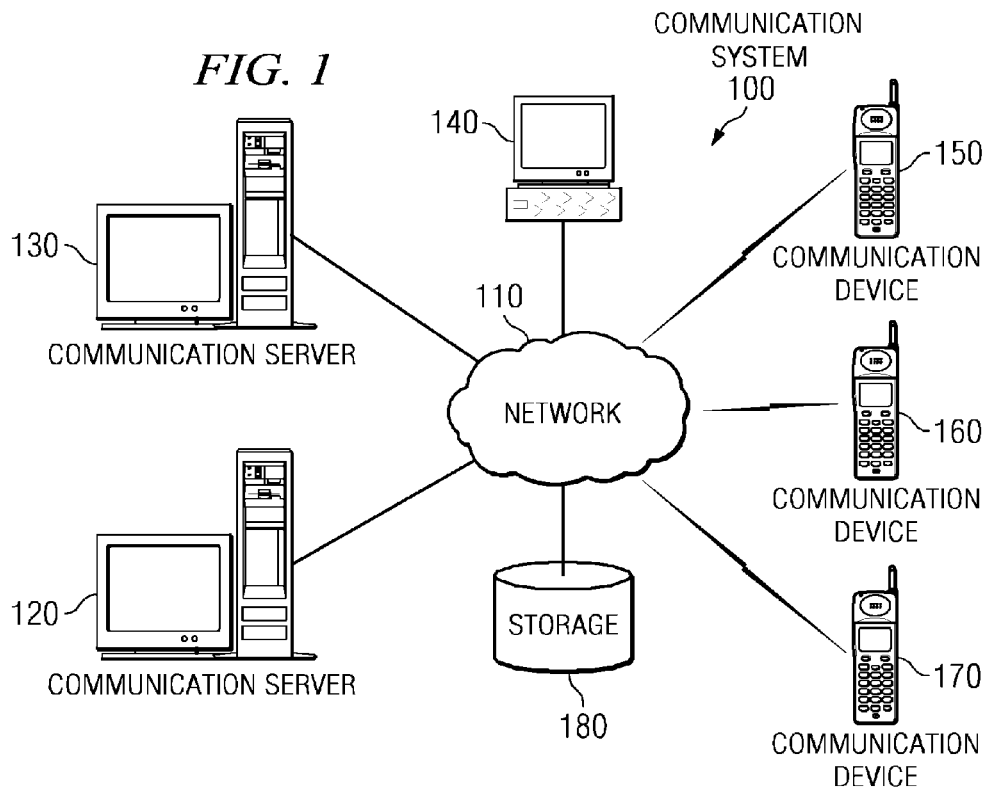
FIG. 1 is a pictorial representation of a communication system in which illustrative embodiments may be implemented.

With reference now to the figures, FIG. 1 depicts a pictorial representation of a communication system in which illustrative embodiments may be implemented. Communication system 100 is a network of computers and other devices in which illustrative embodiments may be implemented. Communication system 100 may include a plurality of communication networks. A communication network is a network that includes all components necessary to provide communication services to a plurality of clients.

Communication system 100 contains network 110, which is the medium used to provide communication links between the various computers and other devices coupled together within communication system 100. Network 110 may include several types of connections, such as wire, wireless communication links, or fiber optic cables. However, for this illustrative embodiment depicted in FIG. 1, wireless communication links are emphasized.

In the depicted example of FIG. 1, server 120 and server 130 are coupled to network 110 by wire or wireless communication links. Servers 120 and 130 may, for example, be communication servers with high speed connections to network 110. Also, server 120 may represent a plurality of communication servers located within a local area network (LAN) or a wide area network (WAN). Similarly, server 130 may represent a plurality of communication servers located within a LAN or WAN. Further, communication server 120 may, for example, reside within one cellular telephone service provider (SP) network and communication server 130 may reside in another cellular telephone SP network. In another illustrative embodiment, communication server 120 may, for example, independently provide communication services for a plurality of cellular telephone SP networks.

Communication devices 140, 150, 160, and 170, along with storage unit 180, also are coupled to network 110 via wire or wireless links. In addition, communication devices 140 and 150 may, for example, be clients to communication server 120. Likewise, communication devices 160 and 170 may be clients to communication server 120. In this illustrative example, communication device 130 is a personal computer using a conventional land line communication link and communication devices 140, 150, and 160 are cellular telephones relying on wireless communication links.

However, it should be noted that besides being personal computers and cellular telephones, the communication devices shown in FIG. 1 may, for example, be personal digital assistants (PDAs), handheld computers, laptop computers, larger data processing systems, other communication servers, or any combination thereof. Furthermore, illustrative embodiments are not restricted to the above-listed communication devices. Illustrative embodiments may utilize any communication device that is capable of accomplishing processes of illustrative embodiments.

Storage unit 180 represents any type of storage device that is capable of storing data in a structured and/or unstructured format. Also, storage unit 180 may, for example, be a repository. A repository is a central place where multiple databases may be located for distribution over a network.

In this particular example of FIG. 1, storage unit 180 is a central repository that stores customer information for a plurality of cellular telephone SP network databases, which are synchronized with storage unit 180, for distribution over network 110. This synchronization of storage unit 180 with the plurality of cellular telephone SP network databases is the basis for providing a central data repository of customer information for a plurality of cellular telephone SPs. Thus, storage unit 180 may contain information, such as, for example, customer names, telephone numbers, and customer identification numbers, for the plurality of SPs. In addition, storage unit 180 may store indicators, such as, for example, when a user changes telephone numbers, or when a telephone number is no longer in service, or when a telephone number is currently under repair. Also, storage unit 180 may store an indicator for when a user changes SPs. However, it should be noted that storage unit 180 may contain any data and indicators necessary for processes of illustrative embodiments to automatically verify and update telephone numbers across SPs in real time.

Additionally, communication system 100 may, for example, include additional servers, clients, storage units, and other devices not shown. Moreover, communication system 100 may, for example, represent the Internet with network 110 representing a worldwide collection of networks and gateways that use the transmission control protocol/internet protocol (TCP/IP) suite of protocols to communicate with one another. Internet protocol (IP) telephony is the two-way transmission of voice over a packet-switched IP network, which is part of the TCP/IP suite of protocols. The terms "IP telephony" and "voice over IP" (VoIP) are synonymous. VoIP is a telephone service that uses the Internet as a global telephone network. At the heart of the Internet is a backbone of high-speed data communication lines between major nodes or host computers, consisting of thousands of commercial, government, educational and other computer systems that route data and messages.

It should be appreciated by those of ordinary skill in the art that FIG. 1 is only intended as an exemplary illustration and is not intended as an architectural limitation for illustrative embodiments. Further, it should be appreciated by those of ordinary skill in the art that even though the example of FIG. 1 depicts a telephone network, illustrative embodiments may, for example, be utilized in an e-mail network, instant messaging network, or any other network system that requires connection data, such as e-mail addresses, instant messaging screen names, and the like, stored in a storage device and used to connect network users with one another. Thus, a user may utilize illustrative embodiments to automatically verify and update e-mail addresses and instant messaging screen names across SPs.

Illustrative embodiments provide a computer implemented method and computer usable program code in a communication device for automatically verifying and updating a telephone number for a calling party prior to connecting a call across SPs. Alternatively, illustrative embodiments may automatically verify and update a telephone number for the calling party in real-time while an SP is connecting the call. In response to a telephone number being dialed manually by a user using the communication device or automatically by the communication device, itself, a telephone number verification unit makes a determination as to whether a contact name in a central repository associated with the dialed telephone number matches a contact name in a storage device associated with the dialed telephone number. The central repository, such as storage unit 180, stores customer data for a plurality of cellular telephone SP network databases for distribution over a network, such as network 110. The central repository is synchronized with the plurality of SP databases to provide accurate, up-to-date data across the plurality of SPs.

However, it should be noted that illustrative embodiments may not require that the contact name in the central repository exactly match the contact name in the storage device. For example, the contact name in the central repository may include a first, middle, and last name, whereas the contact name in the storage device may only include the first and last name, which is not an exact match but is a "strong indication" of a match nonetheless. Furthermore, the contact name in the storage device may, for example, include a "nickname" or other reference, which also may be used as a strong indication of a match with the contact name in the central repository. Moreover, illustrative embodiments may, for example, automatically update the contact nickname in the storage device with the proper full name from the central repository when the calling party is connected to the called contact nickname. This automatic name updating process may be performed on the fly in the background so the calling party is not aware of the update during the connection. Further, the telephone number verification unit may, for example, send an alert message via a display screen to the calling party, or user, during or after the connection is terminated to notify the user of the name update and request confirmation to save the updated name in the storage device.

In addition to determining whether the contact name in the central repository matches the contact name in the storage device, the telephone number verification unit makes a determination as to whether a timestamp in the central repository associated with the dialed number is more recent than a timestamp in the storage device associated with the dialed number. The timestamp in the central repository is a date and time when a telephone number is activated or changed by the SP and is stored in the central repository with the telephone number. The timestamp in the storage device is a date and time when the user manually, or the communication device automatically, adds a telephone number to the storage device and is stored in the storage device with the telephone number.

The telephone number verification unit compares the stored central repository timestamp with the stored storage device timestamp to determine which is more recent.

If the contact name in the central repository does not match the contact name in the storage device and the timestamp in the central repository is not more recent than the timestamp in the storage device associated with the dialed number, the telephone number verification unit makes a determination as to whether the central repository indicates that a new telephone number is associated with the contact name to automatically verify the dialed telephone number is correct. If the central repository indicates that a new telephone number is associated with the contact name, the telephone number verification unit queries the central repository for the new telephone number. Then, in response to finding the new telephone number in the central repository, the telephone number verification unit routes the dialed telephone number to the new telephone number. In addition to routing the dialed telephone number to the new telephone number, the telephone number verification unit may update the storage device with the new telephone number associated with the contact name.

Also, if the new telephone number is not currently in service, the telephone number verification unit may, for example, send an alert message, such as "Telephone number not currently in service," to the user without connecting the call. However, it should be noted that illustrative embodiments are not limited to the above-mentioned alert messages to the user. Illustrative embodiments may utilize any type of alert message, such as, for example, "Telephone number is changed", "Account is inactive/closed", or "Service provider has changed". Also, it should be noted that the user may customize or configure the alert messages. Furthermore, the telephone number verification unit may, for example, dial telephone numbers stored in the storage device on a predetermined periodic basis to automatically verify and update the telephone numbers in the background. The telephone number verification unit may, for example, perform this periodic process of automatically verifying and updating during non-peak hours.

A user utilizing a communication device that includes an illustrative embodiment will decrease time, frustration, and money spent trying to connect to out-of-date or out-of-service telephone numbers. Thus, a user's satisfaction is increased by utilizing illustrative embodiments because telephone numbers are automatically verified and updated. This automatic process of verifying and updating telephone numbers may be performed across a plurality of SPs because illustrative embodiments utilize the central repository, which stores synchronized data from databases of the plurality of SPs.

Figure 2A:
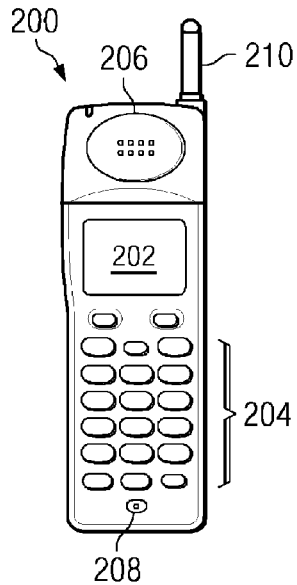
FIG. 2A is a pictorial representation of a communication device in which illustrative embodiments may be implemented.

With reference now to FIG. 2A, a pictorial representation of a communication device is depicted in which illustrative embodiments may be implemented. In the illustrative example of FIG. 2A, communication device 200 is a cellular telephone. However, illustrative embodiments may utilize any type of communication device to accomplish processes of illustrative embodiments. Communication device 200 may, for example, be communication device 150 in FIG. 1.

Communication device 200 includes display 202 to present textual and graphical information to a user. Display 202 may be a known display device, such as a liquid crystal display (LCD). Communication device 200 also includes keypad 204, speaker 206, and microphone 208. Keypad 204 may be utilized to enter telephone numbers, user identification information, and commands for interacting with the interface. Audio feedback may be presented via speaker 206. Microphone 208 may be used not only for voice communication, but also for entering specific voice commands for voice actuated functions. Further, communication device 200 uses antenna 210 to establish wireless communication links with a network, such as, for example, network 110 in FIG. 1. However, it should be noted that even though antenna 210 is shown as an external antenna in FIG. 2A, antenna 210 may represent an internal antenna as well.

Figure 2B:
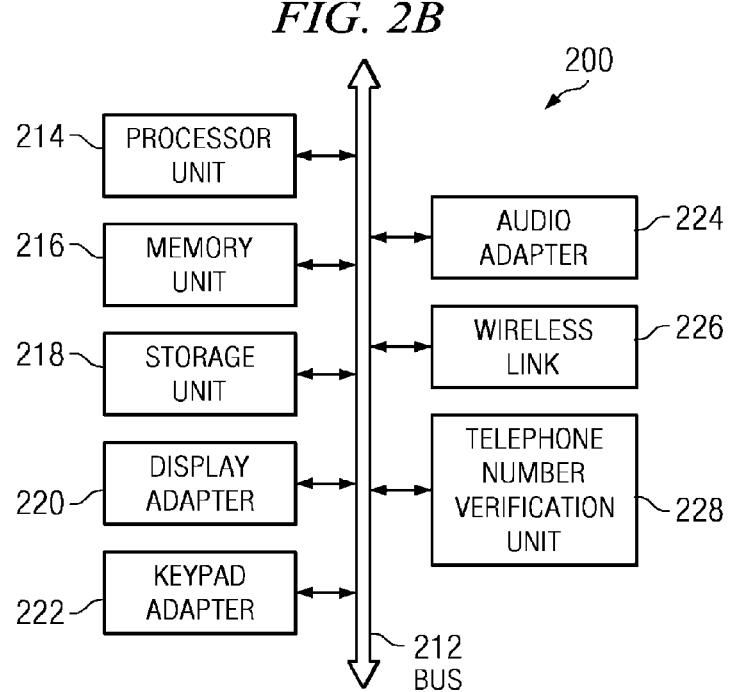
FIG. 2B is a block diagram of a communication device in accordance with an illustrative embodiment.

With reference now to FIG. 2B, a block diagram of a communication device is depicted in accordance with an illustrative embodiment. In the illustrative example of FIG. 2B, communication device 200 utilizes a bus architecture, such as bus 212. Bus 212 may include one or more buses. In addition, bus 212 may be implemented using any type of communication fabric or architecture that provides for a transfer of data between the different components or devices coupled to bus 212.

Communication device 200 includes processor unit 214, memory unit 216, storage unit 218, display adapter 220, keypad adapter 222, audio adapter 224, wireless link 226, and telephone number verification unit 228 connected to bus 212. However, it should be noted that communication device 200 is only shown for exemplary purposes and is not meant as an architectural limitation to illustrative embodiments. Communication device 200 may include more or fewer components as necessary to perform processes of illustrative embodiments.

Processor unit 214 provides the data processing capabilities of communication device 200. An operating system runs on processor unit 214 and coordinates and provides control of various components within communication device 200. In addition, software applications executing on communication device 200 may run in conjunction with the operating system.

Storage unit 218 is a non-volatile memory or storage device that may, for example, be configured as read only memory (ROM) and/or flash ROM to provide the non-volatile memory for storing the operating system and/or user data. Storage unit 218 stores instructions or computer usable program code for the operating system and applications. The instructions are loaded into memory unit 216 for execution by processor unit 214. Processor unit 214 performs processes of illustrative embodiments by executing the computer usable program code that is loaded into memory unit 216.

The user data stored in storage unit 218 may, for example, include data inputted by the user, such as contact names, addresses, descriptions, telephone numbers, e-mail addresses, instant messaging screen names, and the like. However, it should be noted that the user may enable communication device 200 to automatically store contact information within storage unit 218 when a contact connects with communication device 200. A contact is a person or entity that a user wishes to communicate with via communication device 200. Also, these contact names, telephone numbers, e-mail addresses, and instant messaging screen names may, for example, be placed within a contact list. A contact list is a list of all the contacts and associated information the user inputs and stores, or communication device 200 automatically stores, within storage unit 218.

Alternatively, a contact list may only contain a subset of all the contacts stored within storage unit 218, such as, for example, a family, friends, co-workers, businesses, and general contact list. As a result, storage unit 218 may contain one or more contact lists for communication device 200. Further, communication device 200 may store this user data in a central repository, such as, for example, storage 180 in FIG. 1, in addition to or instead of storage unit 218.

Furthermore, this stored user data, such as the one or more contact lists, may be automatically forwarded to a new SP when the user switches to the new SP from a previous SP. In addition, the user may, for example, contact the SP's customer support service to specify which contacts within the one or more contact lists may receive information, such as the user's new telephone number, when a specified contact from the one or more contact lists calls the old telephone number.

Wireless link 226 may, for example, utilize shortwave, high frequency, ultra high frequency, microwave, wireless fidelity (Wi-Fi), Bluetooth, or any other wireless communication means to establish a wireless communication link for communication device 200. Communication device 200 also may rely on wireless application protocol (WAP) for facilitating communications. Wireless application protocol is a standard for providing wireless phones, pagers and other handheld devices with secure access to e-mail and text-based Web pages. Wireless application protocol provides a complete environment for wireless applications that includes a wireless counterpart of TCP/IP and a framework for telephony integration such as call control and phone book access. Wireless application protocol features the wireless markup language (WML), which was derived from Phone.com's handheld device markup language (HDML) and is a streamlined version of hypertext markup language (HTML) for small screen displays. Also, wireless application protocol uses WML-Script, a compact JavaScript-like language that runs in limited memory. Additionally, wireless application protocol supports handheld input methods such as keypad and voice recognition.

Wireless application protocol runs over all the major wireless networks now in place. Also, wireless application protocol is device independent, requiring only a minimum functionality in the unit so that it may be used with a myriad of cellular phones and handheld devices. However, it should be pointed out that wireless application protocol has been described for illustrative purposes, and other wireless protocols may be used to implement illustrative embodiments.

Communication device 200 uses telephone number verification unit 228 to compare the stored user data within storage unit 218 with stored cellular telephone SP network data within the central repository. Telephone number verification unit 228 compares the stored user data with the stored central repository data to verify or confirm that the stored user data, such as a telephone number, is correct and currently in service for an associated contact name prior to connecting the call or in real time during call connection. Moreover, communication device 200 may use telephone number verification unit 228 to automatically compare the stored user data with the stored central repository data on a predetermined periodic basis, such as, for example, weekly or monthly, during non-peak cellular telephone SP network hours in the background so the user is not aware of this process. Also, in addition to automatically verifying telephone numbers, telephone number verification unit 228 may automatically update the stored user data, such as a telephone number associated with a contact name, if data provided by the central repository is more up-to-date than the stored user data within storage unit 218. It should be noted that the process of automatically updating the stored user data may also be performed in the background as well.

Further, it should be noted that a user of communication device 200 may enable and disable telephone number verification unit 228 independently of other communication device 200 functions and features. Furthermore, it should be noted that telephone number verification unit 228 may be implemented entirely as software, hardware, or as a combination of software and hardware components. In addition, telephone number verification unit 228 may, for example, come pre-configured to connect with a plurality of cellular telephone SP network databases in the event that telephone number verification unit 228 is unable to connect with the central repository. Moreover, even though FIG. 2B depicts that communication device 200 includes telephone number verification unit 228, telephone number verification unit 228 may, for example, reside within a cellular telephone SP network or an independent remote site.

Those of ordinary skill in the art will appreciate that the hardware in FIG. 2A and FIG. 2B may vary depending on implementation of illustrative embodiments. Other internal hardware or peripheral devices may be used in addition to or in place of the hardware depicted in FIG. 2A and FIG. 2B. For example, communication device 200 also may include a voice recognition system in order to perform functions activated by user voice command.

Figure 3:
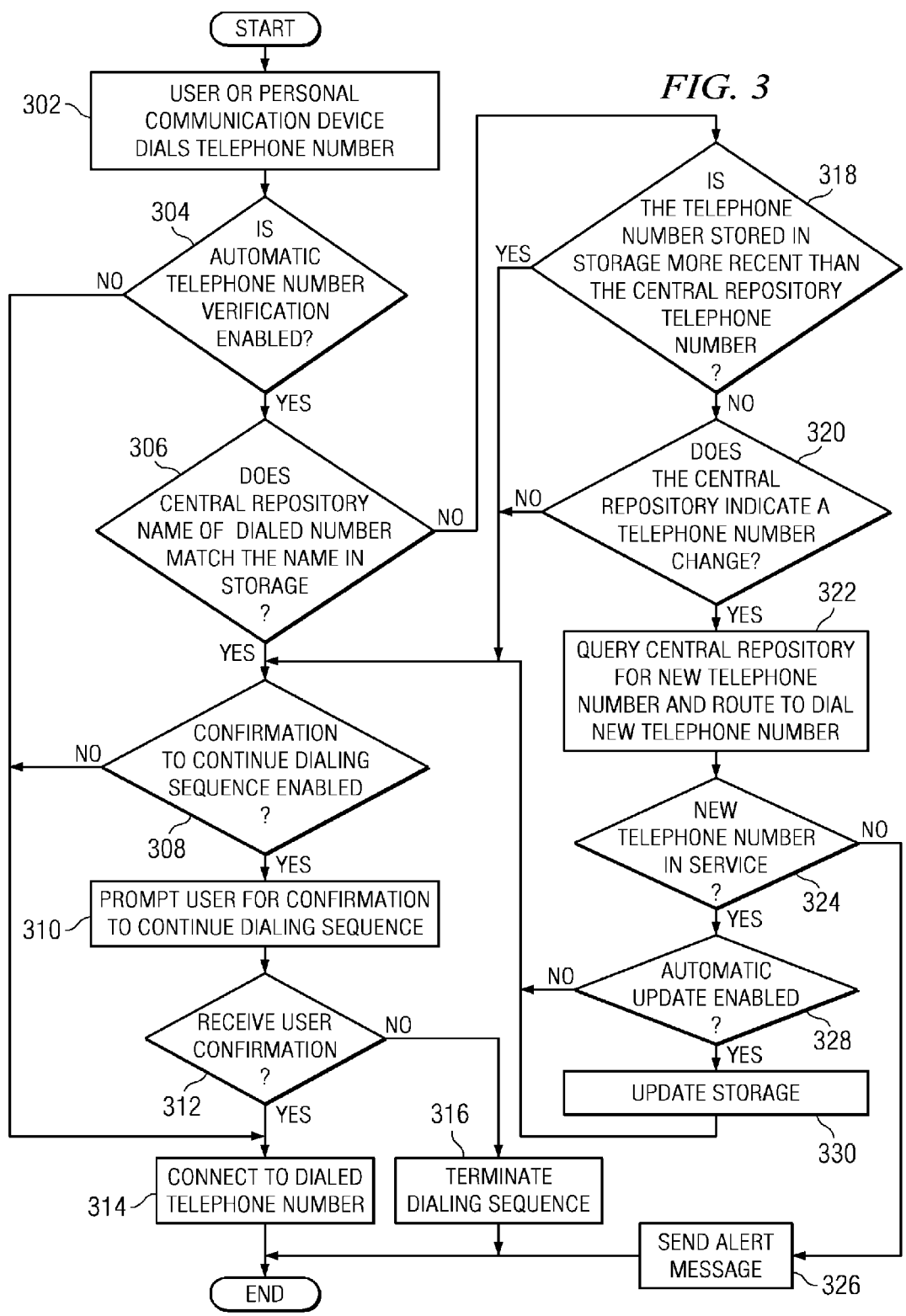
FIG. 3 is a flowchart illustrating an exemplary process for automatically verifying and updating telephone numbers across service providers in accordance with an illustrative embodiment.

With reference now to FIG. 3, a flowchart illustrating an exemplary process for automatically verifying and updating telephone numbers across service providers is shown in accordance with an illustrative embodiment. The process shown in FIG. 3 may be implemented in a communication device, such as, for example, communication device 200 in FIGS. 2A and 2B.

The process begins when a user using the communication device manually dials a telephone number on a keypad, such as keypad 204 in FIG. 2A (step 302). Alternatively, the communication device may use a telephone number verification unit, such as telephone number verification unit 228 in FIG. 2B, to automatically dial a telephone number from a contact list in a storage device, such as storage unit 218 in FIG. 2B, during, for example, non-peak cellular telephone SP network hours on a predetermined periodic basis in the background. Subsequent to the user manually dialing or the communication device automatically dialing a telephone number in step 302, the communication device makes a determination as to whether the user enabled an automatic telephone number verification unit, such as telephone number verification unit 228 in FIG. 2B (step 304).

If the user did not enable the automatic telephone number verification unit, no output of step 304, then the process proceeds to step 314 where the communication device connects to the telephone number as dialed. If the user did enable the automatic telephone number verification unit, yes output of step 304, then the communication device makes a determination as to whether the contact name in a central repository, such as storage 180 in FIG. 1, associated with the dialed number matches the contact name in the storage unit associated with the dialed number (step 306).

If the contact name in the central repository matches the contact name in the storage unit, yes output of step 306, then the communication device makes a determination as to whether the user enabled a confirmation to continue dialing sequence function (step 308). If the user did not enable the confirmation to continue dialing sequence function, no output of step 308, then the process proceeds to step 314 where the communication device connects to the telephone number as dialed. If the user did enable the confirmation to continue dialing sequence function, yes output of step 308, then the communication device prompts the user using a display screen, such as display 202 in FIG. 2A, for confirmation to continue the dialing sequence (step 310).

After prompting the user for confirmation to continue the dialing sequence in step 310, the communication device makes a determination as to whether the communication device receives user confirmation (step 312). If the communication device receives user confirmation to continue the dialing sequence, yes output of step 312, then the communication device connects to the telephone number as dialed (step 314). If the communication device does not receive user confirmation to continue the dialing sequence, no output of step 312, then the communication device terminates the dialing sequence (step 316). The process terminates thereafter.

Returning now to step 306, if the contact name in the central repository does not match the contact name in the storage unit, no output of step 306, then the communication device makes a determination as to whether the stored telephone number associated with the contact name within the storage unit is more recent than the central repository telephone number associated with the contact name by comparing timestamps (step 318). For example, the user or communication device actually dials the correct telephone number for the desired contact name in step 302, but the stored contact name for the dialed telephone number in the storage unit is not an "exact match" or a "strong indication" of a match to the stored contact name for the dialed telephone number in the central repository. Alternatively, the user or communication device actually dials an incorrect telephone number for the desired contact name in step 302, so the stored contact name for the dialed telephone number in the storage unit will not match the stored contact name for the dialed telephone number in the central repository. Consequently, the communication device makes a determination in step 318 as to whether the stored telephone number associated with the contact name within the storage unit is more recent than the central repository telephone number associated with the contact name by comparing timestamps. In both examples above, the timestamp in the storage unit for the dialed telephone number is more recent than the timestamp in the central repository because the telephone number in the central repository, whether correct or incorrect for the desired contact, was stored in the central repository prior to the time the telephone number was stored in the storage unit manually by the user or automatically by the communication device. However, it should be noted that in another illustrative embodiment, the communication device may perform step 318 prior to step 306.

If the stored telephone number associated with the contact name within the storage unit is more recent than the central repository telephone number, yes output of step 318, then the process returns to step 308 where the communication device makes a determination as to whether the user enabled the confirmation to continue dialing sequence function. If the stored telephone number associated with the contact name within the storage unit is not more recent than the central repository telephone number, no output of step 318, then the communication device makes a determination as to whether the central repository indicates a telephone number change for the associated contact name (step 320). The central repository may, for example, use a flag or bit to indicate that the telephone number for the associated contact name has been changed.

If the central repository does not indicate a telephone number change for the associated contact name, no output of step 320, then the process returns to step 308 where the communication device makes a determination as to whether the user enabled the confirmation to continue dialing sequence function. If the central repository does indicate a telephone number change for the associated contact name, yes output of step 320, then the communication device queries the central repository for the new telephone number and routes to dial the new number (step 322). Subsequent to querying the central repository for the new telephone number and routing to dial the new number in step 322, the communication device makes a determination as to whether the new telephone number is currently in service (step 324).

If the new telephone number is not in service, no output of step 324, then the communication device sends the user an alert message via the display screen (step 326) and the process terminates thereafter. If the new telephone number is in service, yes output of step 324, then the communication device makes a determination as to whether the user enabled an automatic update function (step 328). The automatic update function automatically updates out-of-date user data, such as, for example, an out-of-date dialed telephone number for an associated contact name, within the storage unit to correspond with the central repository data. If the user did not enable the automatic update function, no output of step 328, then the process returns to step 308 where the communication device makes a determination as to whether the user enabled the confirmation to continue dialing sequence function. If the user did enable the automatic update function, yes output of step 328, then the communication device automatically updates the user data within the storage unit (step 330). After automatically updating the user data within the storage unit in step 330, the process once again returns to step 308.

Thus, illustrative embodiments provide a computer implemented method, system, and computer usable program code for automatically verifying and updating a telephone number across service providers by providing a central repository. The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain or store the program for use by or in connection with the instruction execution system, apparatus, or device.

The medium can be an electronic, magnetic, optical, or semiconductor system (or apparatus or device). Examples of a computer-readable medium include a semiconductor or solid state memory, magnetic tape, a removable computer diskette, a random access memory (RAM), a ROM, a rigid magnetic disk, and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method in a communication device for automatically verifying and updating a telephone number across service providers, the computer implemented method comprising:

responsive to a telephone number within a plurality of telephone numbers stored in a storage device being automatically dialed into a central repository by a telephone number verification unit in a cellular telephone during non-peak cellular telephone service provider network hours on a predetermined periodic basis in the background when the cellular telephone is not in use, wherein, the verification unit when enabled can only connect the cellular telephone to the central repository, determining, by the telephone number verification unit in the cellular telephone, if the central repository indicates that a new telephone number is associated with the dialed telephone number, wherein the central repository stores data from a plurality of databases for a plurality of different cellular telephone service providers, and wherein the central repository is synchronized with the plurality of databases for the plurality of different cellular telephone service providers;

responsive to the central repository indicating that a new telephone number is associated with the dialed telephone number, querying, by the telephone number verification unit in the cellular telephone, the central repository for the new telephone number; and updating, by the telephone number verification unit in the cellular telephone, the storage device with the new telephone number.

2. The computer implemented method of claim 1, further comprising:

sending, by the cellular telephone, an alert message via a display to a user of the cellular telephone.

3. The computer implemented method of claim 1, wherein the storage device stores user data, and wherein the user data includes contact names, telephone numbers, e-mail addresses, and instant messaging screen names, and wherein the user data is included within one or more contact lists, and wherein the one or more contact lists are automatically forwarded to a new cellular telephone service provider when the user switches to the new cellular telephone service provider from a previous cellular telephone service provider.

4. The computer implemented method of claim 1, wherein the central repository is located at a remote site.

5. A computer usable storage medium storing computer usable program code when executed by a processor cause the processor to automatically verify and update a telephone number, the computer usable storage medium comprising:

computer usable program code configured to determine, by a telephone number verification unit in a cellular telephone, if a central repository indicates that a new telephone number is associated with a dialed telephone number in response to a telephone number within a plurality of telephone numbers stored in a storage device being automatically dialed into the central repository by the telephone number verification unit in the cellular telephone during non-peak cellular telephone service provider network hours on a predetermined periodic basis in the background when the cellular telephone is not in use, wherein, the verification unit when enabled can only connect the cellular telephone to the central repository, and wherein the central repository includes data from a plurality of databases for a plurality of different cellular telephone service providers, and wherein the central repository is synchronized with the plurality of databases for the plurality of different cellular telephone service providers;

computer usable program code configured to query, by the telephone number verification unit in the cellular telephone, the central repository for the new telephone number in response to the central repository indicating that a new telephone number is associated with the dialed telephone number; and computer usable program code configured to update, by telephone number verification unit in the cellular telephone, the storage device with the new telephone number.

6. The computer usable storage medium of claim 5, further comprising:

computer usable program code configured to send, by the cellular telephone, an alert message via a display to a user of the cellular telephone.

7. The computer usable storage medium of claim 5, wherein the storage device stores user data, and wherein the user data includes contact names, telephone numbers, e-mail addresses, and instant messaging screen names, and wherein the user data is included within one or more contact lists, and wherein the one or more contact lists are automatically forwarded to a new cellular telephone service provider when the user switches to the new cellular telephone service provider from a previous cellular telephone service provider.

8. The computer usable storage medium of claim 5, wherein the central repository is located at a remote site.

9. A data processing system for automatically verifying and updating a telephone number across service providers, the data processing system comprising:

a bus;

a storage device connected to the bus, wherein the storage device stores instructions; and a processor device connected to the bus, wherein the processor device executes the instructions to determine, by a telephone number verification unit in a cellular telephone, if a central repository indicates that a new telephone number is associated with the dialed telephone number in response to a telephone number within a plurality of telephone numbers stored in a storage device being automatically dialed into the central repository by the telephone number verification unit in the cellular telephone during non-peak cellular telephone service provider network hours on a predetermined periodic basis in the background when the cellular telephone is not in use, wherein, the verification unit when enabled can only connect the cellular telephone to the central repository, and wherein the central repository includes data from a plurality of databases for a plurality of different cellular telephone service providers, and wherein the central repository is synchronized with the plurality of databases for the plurality of different cellular telephone service providers; query, by the telephone number verification unit in the cellular telephone, the central repository for the new telephone number in response to the central repository indicating that a new telephone number is associated with the dialed telephone number; and update, by the telephone number verification unit in the cellular telephone, the storage device with the new telephone number.

10. The data processing system of claim 9, wherein the processor device executes further instructions to send an alert message via a display to a user of the cellular telephone.

11. The data processing system of claim 9, wherein the storage device stores user data, and wherein the user data includes contact names, telephone numbers, e-mail addresses, and instant messaging screen names, and wherein the user data is included within one or more contact lists, and wherein the one or more contact lists are automatically forwarded to a new cellular telephone service provider when the user switches to the new cellular telephone service provider from a previous cellular telephone service provider.

12. The data processing system of claim 9, wherein the central repository is located at a remote site.

* * * * *